United States Patent Office 2,974,044
Patented Mar. 7, 1961

2,974,044
MICROBIOLOGICAL PRODUCTION OF CAROTENOIDS

Wendall Moore Farrow, Orange, and Benjamin Tabenkin, Montclair, N.J., assignors to Hoffmann-La Roche Inc., Nutley, N.J., a corporation of New Jersey No Drawing. Filed Nov. 12, 1958, Ser. No. 773,184

14 Claims. (Cl. 99—4)

Carotenoids constitute a class of highly colored compounds ranging from yellow to red in hue which are widely dispersed in nature. Many of the carotenoids in isolated form are useful as coloring agents because of their strong pigmenting power, or for their growth promoting properties and/or vitamin A activity. Xanthophylls, the oxygen-containing carotenoids, are of particular interest.

It is an object of this invention to provide a process by means of which carotenoids and especially xanthophylls may be produced in high yield on a practical scale by microbiological means. It is also an object of this invention to provide carotenoid-containing materials which may may be used as coloring agents and compositions containing such carotenoid-bearing materials. It is an especial object of this invention to provide materials rich in xanthophylls.

According to this invention carotenoids, and xanthophylls in particular, may be produced by microbiological means wherein particularly adaptable organisms are cultured under conditions stimulating the production of the pigments in high yield. It has been found that fungi of the family Dacrymycetaceae constitute a group of organisms which are especially adaptable to the production of high yields of xanthophylls under properly controlled conditions. The Dacrymycetaceae of interest in this invention are those fungi in the family according to the classification of G. W. Martin, "Revision of the North Central Tremellales," Study Series No. 423, Univ. Iowa Stud. Nat. Hist. 19, 1–122 (1952), and include such genera as Dacrymyces, Dacryomitra, Dacryopinax, Guepiniopsis, Femsjonia, Calocera, etc. Various species fall within the respective genera, e.g. *Dacrymyces deliquescens, Dacrymyces ellisii, Dacrymyces palmatus, Dacrymyces minor, Dacryomitra nuda, Dacryopinax spathularia, Dacryopinax elegans, Guepiniopsis torta, Femsjonia luteoalba, Ditiola radicata, Calocera cornea,* etc.

It has also been found that the conditions of fermentation and particularly the composition of the nutrient medium are especially important in the successful production of practical yields of carotenoids. The method for the production of material rich in carotenoids, and particularly in xanthophylls, according to this invention, requires certain minimum conditions for practical scale operation. This method comprises culturing a fungus of the family Dacrymycetaceae in submerged culture in an aqueous medium containing a source of assimilable organic nitrogen, a source of ammonia nitrogen, a metabolizable source of carbon, a metabolizable source of phosphorus and trace minerals while maintaining the culture under conditions of aeration and agitation, and subjecting the fungal material to radiation in the visible spectrum. The composition of the nutrient medium is responsible for good fungal growth and results in substantial production carotenoid and particularly xanthophyll-rich material. Development of the organism without substantial production of pigment is minimized.

The procedure outlined above results in practical scale yields of xanthophylls such as zeaxanthin, canthaxanthin, cryptoxanthin, violaxanthin, torulene, torularhodin and rhodotorulin, which are of particular interest, as well as others in the class. It will be appreciated that β-carotene and other carotenes are also produced in the process.

It has been found that the conditions under which the fungus of the family Dacrymycetaceae is cultured as well as the composition of the nutrient medium are critical to high pigment production.

The fermentation process must be effected under conditions of submerged culture. That is, the organism is grown in a liquid medium while agitating and providing an adequate supply of oxygen.

Oxygenation and continued agitation are required during the fermentation process with each of the organisms. Mycelial development is much more prolific when the culture medium is agitated and kept in motion. Oxygenation may be accomplished by the introduction of air, preferably sterile, through a unit giving good dispersion and producing small bubbles. This may be effected by passing compressed air through perforated pipes or plates, porous ceramic gas distributors or other conventional means placed within the fermentation medium. Aeration rates will vary, depending upon the technique employed, but rates within the range of about 0.1 to 2.5 volumes of air per minute per unit volume of culture liquid generally will suffice. Aeration, at a suitable rate, is maintained throughout the fermentation cycle.

Agitation by any convenient means must be provided. It may be supplied by anchor or rake type agitator blade or by a turbine type high speed impeller, or by circulating the mass to be agitated through pumps which transfer the liquid from one location to another. The rate of agitation should be high enough to give thorough dispersion without, however, causing undue maceration of the fungal tissue. We prefer to conduct the fermentation completely in an aqueous medium contained in a closed tank fitted with an air dispersion device and a conventional impeller operating at shaft speeds of about 50 to 400 r.p.m.

Irradiation with electro-magnetic energy within the wave length range of about 3200 to 7600 A. during the development of the fungal growth has been found to be necessary to obtain maximal pigment production. It is not necessary to irradiate continuously. It is essential only during the final stages of development of the culture, e.g. the terminal 30–50% of the incubation period. Irradiation during the entire period of incubation may, however, be practiced to advantage and may be intermittent. Each species of organism has its own radiation requirements for maximal production, but this falls within the range mentioned above and may be readily determined. The illumination intensity may be within the range of about 5 to 1000 footcandles.

Not only is the total production of xanthophylls affected by the radiation, but the ratio of xanthophylls to total carotenoids produced by each organism is also subject to variation according to the wave length used for irradiation. For example, with *Dacrymyces deliquescens,* the wave length resulting in the highest ratio of xanthophylls to total carotenoids is that of green light, or about 5300 A. The highest total yield of xanthophylls occurs with pink light of about 6200 A. With *Dacryopinax spathularia,* the highest yield of xanthophylls, as well as the highest ratio of xanthophylls to total carotenoids, occurs with light of about 5800 A.

The nutrition of the organism is a most important factor. A source of assimilable organic nitrogen, ammonia nitrogen, a metabolizable source of carbon, a metabolizable source of phosphorus and trace minerals represents the minimum requirements, as indicated previously. Other nutrients may be added to advantage as more fully discussed below. These nutrients should be present in the following proportions: organic nitrogen—0.025 to 2.5 gms. nitrogen per liter of medium; ammonia nitrogen—0.025 to 2.0 gms. of nitrogen per liter of medium; metabolizable carbon—1 to 80 gms. per liter of medium, phosphorus—0.1 to 2 gms. per liter, and trace minerals, that is, zinc, magnesium and iron, 1 to 500 mg. per liter of medium.

The nutrients may all be added at the initiation of the fermentation process or they may be added in portions at various stages as the fermentation progresses.

Amino acids are the preferred sources of assimilable organic nitrogen. Thus serine, lysine, leucine, isoleucine, arginine, aspartic acid, tryptophane, proline, threonine, methionine, cystine, cysteine, phenylalanine, tyrosine, histidine, valine, glycine, alanine, hydroxyproline, homoserine, allohydroxyproline, ethionine, asparagine, glutamic acid, glutamine, etc., alone or in combinations, may be employed. Glutamic acid, a glutamate salt, or glycine are preferred. The incorporation of 1-tryptophane into a medium containing glutamic acid is particularly effective.

Ammonium hydroxide or ammonium salts, as for example, ammonium nitrate, ammonium sulfate, ammonium tartrate, ammonium chloride, ammonium phosphate, ammonium carbonate, etc., may be used as sources of ammonia nitrogen. Ammonium nitrate is preferred.

Urea and acetamide are also suitable sources of nitrogen.

Assimilable carbon for the nutrient medium is best obtained from carbohydrates, although other sources such as proteins, hydrolyzed proteins, lipids, etc., may also be used. Carbohydrates such as glucose, sucrose, invert sugar, maltose, fructose, xylose, arabinose, cellobiose, melezitose, galactose, glycerol, raw sugar, black strap molasses, invert molasses, mannitol, sorbose, lactose, cellulose, starch, amylose, and dextrins all promote growth and pigment production. Glucose, sucrose, and invert sugar are preferred.

Small amounts of phosphorus are also essential to growth. This may be supplied in the form of inorganic phosphates, such as potassium acid phosphate, disodium phosphate, or the like, in the amounts specified above. The trace metals, zinc, magnesium and iron, in amounts of about 0.1 to about 50 mg. percent, must be present for growth on a practical scale to take place. These may be introduced as inorganic salts, as metallo-organic complexes or as organically bound metal. Other metals such as calcium, boron, copper, manganese, and molybdenum are also stimulatory and may also be included in trace amounts.

Vitamin $B_1$ (thiamine) in small amounts may also be included in the medium to good effect. The vitamin $B_1$ may be obtained from any source of vitamin $B_1$-active material, e.g. pure substances, such as thiamine chloride hydrochloride, thiamine bromide hydrobromide, thiamine nitrate, thiamine sulfate or crude mixtures, including natural materials of biological origin containing these substances.

The addition in small amounts of various other vitamins and similar agents such as pantothenic acid, riboflavin, niacin, inositol, p-aminobenzoic acid, biotin, pyridoxine, folic acid, thioctic acid and vitamin $B_{12}$ to the medium, singly or in combinations, produces a varied amount of growth stimulation and pigment production with various fungi.

For certain of the organisms, the addition of small amounts of protein or hydrolyzed protein is also stimulatory. For example, with Dacrymyces deliquescens, the addition of 0.05 to 1% of hydrolyzed or unhydrolyzed milk albumin, skim milk solids, soybean protein, cottonseed protein, casein, yeast, distillers dried solubles, corn steep water, wheat protein, meat scrap, fish meal or other plant or animal products further stimulates growth and pigment production.

While each of the organisms shows an individual response with respect to maximal growth and pigment production to particular nutrient media, a nutrient medium having a composition as follows in general produces good results:

| Component | Concentration percent (w./v.) | Preferred Concentration percent (w./v.) |
|---|---|---|
| Glucose | 0.2–10 | 1.5–5 |
| Corn steep liquor | 0.02–2 | 0.3 |
| Enzyme hydrolyzed yeast | 0.01–1 | 0.1–0.2 |
| Glutamic acid | 0.02–1 | 0.1–0.2 |
| Vitamin $B_1$ mg. percent | 0.05–5.0 | 0.2–0.5 |
| Potassium acid phosphate | 0.05–1 | 0.10–0.20 |
| Magnesium sulfate | 0.05–1 | 0.10–0.20 |
| Ammonium nitrate | 0.02–1 | 0.1–0.2 |

Another composition which gives good results is the following:

Component:           Concentration percent (w./v.)
    Glucose ——————————————————— 3.5
    Corn steep liquor ———————————— 0.3
    Diammonium phosphate ——————— 0.2
    Potassium acid phosphate ——————— 0.15
    Magnesium sulfate ——————————— 0.15
    Potassium chloride —————————— 0.10
    Enzyme hydrolyzed lactalbumin ——— 0.10
    Enzyme hydrolyzed soybean protein — 0.10
    Calcium pantothenate, 1 mg.

Maximum yields are generally reached in from 90 to 144 hours, although it is occasionally advantageous to extend the fermentation time to as long as 240 hours. The period of fermentation giving best results for a particular organism may be determined by frequent sampling of the culture.

The optimum temperature for growth and carotenoid production varies somewhat for each organism. However, a temperature within the range 20° to 32° C., preferably 25° to 28° C. in general gives a good response.

It is preferable to begin the fermentation at an initial pH of about 6. During the fermentation, acids accumulate which reduce the pH to about 2.1 to about 2.5. Although such a low pH is not particularly detrimental to fungal growth and pigment formation, it is highly corrosive to metal equipment. Therefore it is usually advantageous to maintain the pH of the culture within the range of about 3.5 to about 5.5 by means of batchwise or continuous addition of an alkali such as sodium hydroxide, potassium hydroxide, calcium hydroxide, ammonium hydroxide, sodium carbonate, potassium carbonate, etc. In general, a pH withing the range of about 2.1 to about 8.5 does not impede fermentation.

Cultures of the organisms of the family Dacrymycetaceae may be maintained for long periods on agar slants of malt extract agar of the following composition:

Concentration percent (w./v.)
Malt extract (Difco) ———————————————— 1.5
Peptone (Difco) ——————————————————— 0.7
Agar ——————————————————————————— 2.0
Vitamin $B_1$, 0.5 mg. percent.
pH before sterilization, 6.0.

Inoculum for the fermentation may be prepared from surface growth on agar slants by grinding the surface growth to a fine pulp with about 10 to 15 ml. of sterile distilled water, e.g. in a tissue homogenizer. About 25 to 50 ml. of the finely homogenized suspension of mycelial tissue is then transferred to a large bottle containing, for example, about 6 liters of inoculum broth having the following approximate composition:

| | Concentration percent (w./v.) |
|---|---|
| High test molasses | 3.6 |
| Hydrolyzed casein | 1.0 |
| Corn steep water | 0.5 |
| Ammonium acetate | 0.2 |
| Potassium acid phosphate | 0.1 | pH adjusted to 5.5–6.0 with dilute alkali before sterilization.

The medium, prior to introduction of the suspension containing the fungal tissue, is sterilized by autoclaving at 120° C. for about 15 minutes, then cooled.

After inoculation, the flask of inoculum medium is set aside at 28° C. and allowed to incubate under diffuse illumination for about 2 to 3 days of quiescent incubation. Then the incubation is continued for 2 to 3 days at the same temperature under continuous irradiation, aeration and agitation. A dense filamentous growth, deep yellow to reddish orange in color, develops in the medium which is ready for use as inoculum.

The fermentation is then effected in large vessels containing nutrient medium as described above. The fermentor is inoculated with about 3 gal. to about 10 gal. of the submerged inoculum, prepared as described above, per 100 gal. of fermentation medium. The fermentation is carried out under conditions of aeration, agitation and irradiation as described above.

At the completion of the fermentation period the mycelium may be removed from the fermentation medium by decantation, centrifugation or filtration. The carotenoid-rich mycelium may then be dried by lyophilization, spray drying, drum drying, hot air drying or by other convenient means.

The xanthophylls and also the carotenes produced by the fungi may be used without removing them from the fungal tissue or they may be recovered and used as a concentrate. For admixture into animal and poultry feeds it is preferable to employ the whole dried mycelium, obtained as described above, as the carrier of the carotenoid pigments. In this case, the dried tissue is reduced to a finely divided state by grinding in a hammer mill, ball mill, attrition mill or other similar device and a minor amount of the ground tissue is thoroughly admixed with a major proportion of a feed such as the commercially available animal feeds, chick growing mash, laying mash, dairy mash, turkey growing mash, etc.

If a more concentrated product is desired, the xanthophyll containing mycelium may be extracted with organic solvents such as methanol, acetone, chloroform, benzene, or other organic solvent or solvent combination, to remove the pigments. On evaporation of the solvent, a syrupy oily concentrate or a solid dry concentrate may be recovered. This concentrate may be admixed with and adsorbed on a basal feed ration or used for other purposes.

The following examples are illustrative of the invention. Cultures of the organisms have been deposited in the collection of microorganisms of the American Type Culture Collection, Washington, D.C., where they have been given the designations indicated.

Example 1

Long agar slants of malt extract agar were prepared in 33 x 200 mm. test tubes. The agar had the following composition:

| | Gms. per liter |
|---|---|
| Difco malt extract | 15 |
| Difco peptone | 7 |
| Agar | 20 | pH before sterilization, 6.0.

These agar slants were inoculated with a culture of *Dacrymyces deliquescens*, ATCC No. 13292, and were allowed to incubate at 25–28° C. in diffuse light for 10 to 15 days. During this time the entire surface of the slope became covered with a mat of rugose, deep yellow to orange growth.

The growth from one agar slant containing a culture of *Dacrymyces deliquescens* was homogenized with about 10–15 ml. of sterile distilled water in a glass tissue homogenizer. Six liters of medium having the following composition was added to each of two 9 liter bottles:

| | Gms. per liter |
|---|---|
| High test molasses | 36 |
| Hydrolyzed casein | 10 |
| Corn steep water | 5 |
| Ammonium acetate | 2 |
| Potassium acid phosphate | 1 | pH adjusted to 5.5–6.0 with dilute alkali.

10 ml. of lard oil defoamer were added to each bottle to control frothing. The bottle fermentors were fitted with connections for inoculation, aeration, venting and sampling. The assemblies containing the medium described above were sterilized by autoclaving at 120° C. for 30 minutes.

When cool, each bottle was inoculated with an amount of homogenized suspension equivalent to the growth derived from half a slant. Each bottle was then allowed to stand quietly for 48 to 72 hours at 28° C. under diffuse irradiation. After the initial quiescent incubation period, aeration was begun and continued steadily at about 5 liters per minute for an additional 48 to 72 hours. During the period of aerated incubation, each bottle was irradiated with light of about 250 foot candles' intensity, produced by a 500 watt incandescent bulb. After a total of 4 to 6 days' incubation, the growth became dense and filamentous and turned a deep yellow to reddish orange color and was ready to use as inoculum.

Two bottles of inoculum (12 liters total volume) were transferred aseptically to 220 liters of sterile fermentation medium contained in a 300 liter fermentor and having the following composition:

| | Percent |
|---|---|
| Cerelose | 3.5 |
| Corn steep liquor | 0.3 |
| Sodium glutamate | 0.2 |
| Ammonium nitrate | 0.2 |
| Enzyme hydrolyzed yeast | 0.15 |
| Potassium acid phosphate | 0.15 |
| Magnesium sulfate | 0.10 |
| Thiamine _____mg__ | 0.1 |
| $ZnSO_4.7H_2O$ | 0.025 | pH adjusted to 5.5.

50 ml. of silicone defoamer were added and the fermentor was sterilized for 20 minutes at 120° C. The contents of the fermentor were illuminated with two 400 watt mercury vapor lamps placed into wells which extended through the cover into the interior of the fermentor.

After the first 24 hours of fermentation, the fermentor was continuously illuminated, aerated and agitated for 168 hours. Air was supplied to the fermentor at the rate of 5 to 25 cubic feet per minute and the agitator was operated at a speed of 60 r.p.m. The temperature was maintained throughout at 25–28° C.

The fermented broth was then placed in a basket centrifuge and the solid material was harvested. 12 kg. of wet mycelium were recovered.

10 kg. of wet mycelium, freshly filtered from the fermentation and equivalent to about 2 kgs. of dry solids, were mixed thoroughly with 20 liters of tap water and ground to a fine pulp in a colloid mill. The ground mycelium was filtered off on a porcelain funnel and transferred to a tank containing 40 liters of acetone. After stirring for about 8 hours, the acetone was filtered off and replaced by 40 liters of fresh acetone. The mass was stirred for 8 hours more and the acetone removed and replaced with 20 liters of fresh acetone. The batch was again filtered and the deeply colored acetone filtrates were pooled. The extracted solids which were now almost colorless, were discarded.

The pooled acetone extracts were reduced to about 20 liters by evaporation at low temperature in a vacuum pan evaporator. This concentrate was then placed in an extraction vessel, diluted with about 50 liters of water, and extracted twice with 20 liter portions of an n-hexane fraction (Skellysolve B). The extract was dried with sodium sulfate and evaporated in vacuo at low temperature to yield a thick syrupy concentrate containing 4920 mg. of carotenoid pigments. By chromatographic analysis the carotenoid portion of the concentrate was found to comprise 3050 mg. of xanthophylls, 1590 mg. of $\beta$-carotene and 280 mg. of other carotenes.

*Example 2*

Slants of malt extract-agar-peptone were prepared in screw capped 18 x 150 mm. test tubes. The medium had the following composition:

| | Per liter |
|---|---|
| Agar | gms 20 |
| Difco malt extract | gms 15 |
| Difco bacto peptone | gms 5 |
| Technical glucose | gms 20 |
| $KH_2PO_4$ | gms 1.0 |
| $MgSO_4.7H_2O$ | gms 0.5 |
| $MnSO_4.7H_2O$ | mg 50 |
| $ZnSO_4.7H_2O$ | mg 25 |
| $FeSO_4.7H_2O$ | mg 25 |
| Thiamine | mg 0.1 |
| Biotin | mg 0.045 |

The pH was adjusted to 6.5 before sterilization.

The agar slants were inoculated with a culture of *Dacrymyces deliquescens*, ATCC No. 13292, and were allowed to incubate in diffuse light of about 20 foot candles in a constant temperature room maintained at 26° to 28° C. In 10-15 days the entire surface of the agar slopes had become covered with a tough mat of rugose deep yellow-to-orange growth.

The growth of one slant was removed in small pieces with a stiff wire needle and transferred to a sterile hand tissue homogenizer, in which it was ground to a fine pulp with 10-15 ml. of sterile distilled water.

The fine pulp was transferred aseptically to a sterile flask and diluted to 25 ml. with sterile distilled water. A 5 ml. aliquot of this suspension was transferred to a 500 ml. flask containing 100 ml. of inoculum medium of the following composition:

| | Per liter |
|---|---|
| Glucose (commercial) | gms 25 |
| Glycerol | gms 5.0 |
| Yeast (enzyme hydrolyzed) | gms 3.0 |
| 1(+) glutamic acid | gms 2.0 |
| Steep liquor | ml 3 |
| Thiamine | gms 1.0 |
| $KH_2PO_4$ | gms 1.5 |
| $MgSO_4$ | gms 0.25 |

The pH was adjusted to 6.0 with ammonium hydroxide, before sterilization.

After inoculation, the flask was set aside in the laboratory at 24°-26° C. and allowed to incubate without agitation overnight. The flask was then placed on a rotary shaker operating at 300 r.p.m. and aerobically incubated further under 80-120 foot candles of illumination emitted by a 300 watt incandescent lamp. In 3 days a heavy reddish orange growth had developed in the medium.

Five ml. of inoculum was transferred aseptically to a 500 ml. flask which contained 100 ml. of a medium of the following composition:

| | Per 100 ml. of medium |
|---|---|
| Glucose (technical grade) | gms 2.5 |
| Concentrated corn steep liquor | ml 0.3 |
| Sodium glutamate | gms 0.3 |
| $KH_2PO_4$ | gms 0.15 |
| $MgSO_4$ | gms 0.05 |
| Yeast (enzyme hydrolyzed) | gms 0.1 |
| Ammonium nitrate | gms 0.2 |
| Thiamine | mg 0.1 |

The medium was adjusted to a pH of 6.1 before autoclaving and was then sterilized by heating at 120° C. for 15 minutes.

After inoculation, the flask was placed on a rotary shaking machine and agitated aerobically at 300 r.p.m. while maintaining the temperature at 26°-28° C. and while exposing the flask and its contents to about 20-80 foot candles of light emitted by a bank of 40 watt cool-white fluorescent lamps.

After 12 hours of incubation, the sugar in the medium had been completely consumed and the flask was harvested.

The pH of the medium was 4.5. The mycelium was filtered off and weighed. The wet weight was about 4.5 grams and, after drying, was equivalent to 1.0 gms. of dry solids.

An aliquot of mycelium equal to 420 mg. of dry solids was extracted with acetone. The acetone was evaporated and the residue was dissolved in dry petroleum ether. The petroleum ether solution was treated with chromatographic grade alumina to adsorb the xanthophylls. The xanthophylls were eluted from the alumina and redissolved in petroleum ether. The petroleum ether insoluble fraction was weighed and then dissolved in chloroform.

All the solvent solutions were analyzed colorimetrically and found to contain a total of 1630 gamma of carotenoid material per 420 mg. of dry mycelium. This is equal to 3890 gamma of carotenoids per gram of dry mycelium. Of this total 3350 gamma was a mixture of xanthophylls and 540 gamma was $\beta$-carotene and other carotenes.

*Example 3*

The procedure as described in Example 2 was followed except that to the fermentation medium, glycerol was added in the amount of 1 gm. per 100 ml. of medium.

When harvested at 121 hours, the flask was found to contain approximately 4.6 gms. of wet mycelium. The mycelium was dried in a vacuum drier at below 40° C. and weighed 1.03 gms.

An aliquot representing 460 mg. of dry mycelium was assayed and found to contain a total of 2010 gamma of carotenoid pigments, equal to 4370 gamma of pigments per gram of dry mycelium. Of this total, 3920 gamma assayed as xanthophyll pigments and 450 gamma assayed as $\beta$-carotene and other carotenes.

*Example 4*

*Guepiniopsis torta*, ATCC No. 13300, was inoculated onto agar slants of the following composition:

| | Per liter |
|---|---|
| Agar | gms 20 |
| Raw sugar | gms 20 |
| Glycerol | gms 10 |
| Steep liquor | gms 4.1 |
| Yeast (enzyme hydrolyzed) | gms 2.0 |
| Thiamine | mg 10 |

The pH was adjusted to 6.5 before sterilization.

After inoculation, the slants were incubated under diffuse illumination for 14 days in a constant temperature room at 26°-28° C.

During this period a yellow-orange rugose mat of growth had developed. The growth on one slant was removed and ground in a tissue homogenizer to a fine pulp. The finely ground growth was diluted to 20 ml. with sterile water and a 5 ml. aliquot was transferred to a 500 ml. flask containing 100 ml. of medium of the following composition:

| | Per liter |
|---|---|
| Difco malt extract | gms__ 15 |
| Difco peptone | gms__ 7 |
| Thiamine | mg__ 1 |
| Biotin | mg__ .01 |

After inoculation, the flask was allowed to sit quietly for 72 hours near the window at 24°–26° C. The flask was then placed on a rotary shaking machine operating at 270 r.p.m. and aerobically incubated an additional 75 hours at 25° C. while maintaining it under the diffuse illumination provided by a warm white fluorescent lamp.

A 5 ml. aliquot of the developed inoculum was transferred to a 500 ml. flask containing 100 ml. of medium of the following composition:

| | Per liter |
|---|---|
| Glucose (technical grade) | gms__ 35 |
| Corn steep water | gms__ 3 |
| l(+) glutamic acid | gms__ 2 |
| Ammonium nitrate | gms__ 2 |
| Potassium acid phosphate | gms__ 1.5 |
| Magnesium sulfate | gms__ 1.0 |
| Enzyme hydrolyzed yeast | gms__ 1.0 |
| Thiamine | mg__ 1.0 |

The pH was adjusted to 6.1 before sterilization.

The inoculated flask was placed on a rotary shaker operating at 270 r.p.m. and aerobically incubated under diffuse illumination for 5 days at 25° C. The flask was then removed from the shaker and the mycelium produced was filtered from the growth medium. The weight of the mycelium was 5.2 gms. On drying, the amount of dry weight produced was found to be 1.04 gms.

An aliquot of the freshly harvested mycelium was assayed for carotenoids and was found to contain 1185 gamma of total carotenoids per gram of dry solids. Of this total, the xanthophyll fraction accounted for 813 gamma per gram. The remaining 372 gamma per gram consisted of $\beta$-carotene and other carotenes.

Example 5

A culture of *Femsjonia luteoalba*, ATCC No. 13299, was treated according to the procedure described in Example 4 and was found to yield 18.8 gms. of dry mycelium per liter of culture. The mycelium contained 1571 gamma per gram of total carotenoids of which 766 gamma per gram comprised a mixture of xanthophylls and 805 gamma per gram was $\beta$-carotene and other carotenes.

Example 6

A culture of *Dacryomitra nuda*, ATCC No. 13296, was treated as described in Example 2 except that the culture was irradiated, during the submerged phases of its growth, with the output of a lamp emitting principally at 5800 A.

The yield of mycelial dry weight was 8.7 grams per liter. The mycelium contained 2540 gamma per gram of total carotenoids, of which 1220 gamma per gram was of mixed xanthophyll composition; 1320 gamma per gram consisted of $\beta$-carotene and other carotenes.

Example 7

*Dacryomitra nuda* was cultured as described in Example 6 except that the culture was irradiated with radiant energy peaking at 4800 A. and at 6200 A. The yield of mycelial dry weight was 9.0 grams per liter. The dry mycelium contained 3260 gamma per gram of total carotenoids, of which 1240 gamma per gram was of xanthophyll composition and 2020 gamma per gram comprised $\beta$-carotene and other carotenes.

Example 8

*Calocera cornea*, ATCC No. 13291, was treated as described in Example 2 except that the culture was irradiated, during incubation, with the radiant energy from a lamp emitting principally in the region of 5800 A. The yield of dry mycelium was 13.4 grams per liter. The mycelium contained 1710 gamma per gram of total carotenoids, of which 430 gamma per gram were xanthophyll pigments. The remainder, or 1280 gamma per gram, consisted of $\beta$-carotene and other carotenes.

Example 9

A 16-day-old agar slant of *Dacrymyces deliquescens* was used to inoculate a 500 ml. flask containing 100 ml. of medium of the following composition:

| | Per liter |
|---|---|
| Glucose (technical) | gms__ 15 |
| Ammonium nitrate | gms__ 1.0 |
| Magnesium sulfate | gms__ 1.5 |
| Enzyme hydrolyzed yeast | gms__ 1.0 |
| Potassium acid phosphate | gms__ 1.5 |
| Corn steep liquor | gms__ 1.0 |
| Enzyme hydrolyzed lactalbumin | gms__ 1.0 |
| l(+) glutamic acid | gms__ 1.0 |
| Zinc sulfate heptahydrate | mg__ 20 |
| Thiamine | mg__ 5 |

The pH was adjusted to 6.0 with sodium hydroxide before sterilization.

The inoculated flask was placed on a table in a constant temperature room at 26° C. and allowed to sit unagitated for 71½ hours. The flask was then placed on a rotary shaking machine operating at 260 r.p.m. and was allowed to incubate with aerobic agitation at 26° C. while being exposed to the radiation from a fixture containing two fluorescent lamps emitting principally at 4800 A. After 41½ hours of incubation, 60 ml. (3% v./v.) of the culture developed was transferred to 2500 ml. of the following medium contained in a 4000 ml. flask:

| | Per liter |
|---|---|
| Glucose (technical) | gms__ 5.0 |
| Ammonium nitrate | gms__ 1.0 |
| Magnesium sulfate | gms__ 1.5 |
| Enzyme hydrolyzed yeast | gms__ 1.0 |
| Potassium acid phosphate | gms__ 1.5 |
| Corn steep liquor | gms__ 1.0 |
| Enzyme hydrolyzed lactalbumin | gms__ 1.0 |
| l(+) glutamic acid | gms__ 1.0 |
| Thiamine | mg__ 5 |

The pH was adjusted to 6.0 with sodium hydroxide before sterilization.

The inoculated flask was placed on a rotary shaker operating at 220 r.p.m. and was incubated aerobically at 26° C. while being irradiated with the light from a 300 watt frosted incandescent lamp.

A 350 ml. aliquot of the growth developed was transferred to a 7500 ml. stirred jar fermentor containing 5000 ml. of the following medium:

| | Per liter |
|---|---|
| Glucose (technical) | gms__ 35 |
| Corn steep liquor | gms__ 3 |
| Diammonium phosphate | gms__ 2 |
| Potassium acid phosphate | gms__ 1.5 |
| Magnesium sulfate | gms__ 1.5 |
| Potassium chloride | gms__ 1.0 |
| Enzyme hydrolyzed lactalbumin | gms__ 1.0 |
| Enzyme hydrolyzed soybean protein | gms__ 1.0 |
| Calcium pantothenate | mg__ 10 |

The pH was adjusted to 6.0 with NaOH, and 3 ml. of Dow Corning Silicone were added before sterilization.

After inoculation, the jar was aerated with 3 liters of air per minute and was agitated with two 3 inch turbines operating at 350 r.p.m. The temperature was maintained at 25°–27° C. and the jar was illuminated continuously with the light from a 500 watt frosted incandescent lamp placed 30 inches away.

After 163 hours of incubation, the fungus had developed a profuse growth which was colored a deep orange-red hue. The fungal dry weight recovered was equivalent to 10.3 grams per liter, containing a total of 3360 gamma per gram of carotenoid pigments. These comprised 1600 gamma per gram of xanthophyll pigments and 1760 gamma per gram of β-carotene and other carotenes. The total dry weight recovered weighed 51.5 grams and contained a total of 173,500 gamma of carotenoid pigments, comprising 82,600 gamma of xanthophyll pigments and 91,000 gamma of β-carotene and other carotenes.

*Example 10*

The procedure described in Example 9 was repeated except that the composition of the fermentation medium has the following ingredients:

| | Per liter |
|---|---|
| Glucose (technical) | gms 50 |
| Corn steep water | gms 3 |
| Enzyme hydrolyzed lactalbumin | gms 3 |
| Diammonium phosphate | gms 4 |
| Potassium acid phosphate | gms 1.5 |
| Magnesium sulfate | gms 1.5 |
| Glycine | gms 1.0 |
| Potassium chloride | gms 1.0 |
| Calcium pantothenate | mg 10 |

After 163 hours of incubation, the mycelial dry weight produced was equal to 18 grams per liter, containing a total of 3140 gamma per gram of carotenoid pigments. These comprised 1550 gamma per gram of xanthophylls and 1590 gamma per gram of β-carotene and other carotenes. A total mycelial dry weight of 90.2 grams was produced, containing a total of 283,230 gamma of carotenoid pigments. These comprised 139,810 gamma of xanthophyll pigments and 143,420 gamma of β-carotene and other carotenes.

*Example 11*

A submerged inoculum of *Dacrymyces deliquescens* was developed in 60 liters of medium of the following composition contained in a 40 gallon glass-lined fermentor:

| | Per liter |
|---|---|
| Glucose (technical) | gms 15 |
| Potassium acid phosphate | gms 1.5 |
| Magnesium sulfate heptahydrate | gms 1.5 |
| Enzyme hydrolyzed yeast | gms 1.0 |
| l(+) glutamic acid | gms 1.0 |
| Ammonium nitrate | gms 1.0 |
| Corn steep water | gms 1.0 |
| Zinc sulfate heptahydrate | mg 20 |
| Thiamine | mg 5 |

The pH was adjusted to 6.0 with ammonia before sterilization and 50 ml. of Dow Corning Silicone Defoamer Emulsion A were added.

The batch was sterilized at 120° C. for 20 minutes and was cooled immediately. After inoculation, the batch was agitated continuously while being aerated with 10 cubic feet per minute of sterile air. The temperature was maintained at 25°–27° C. and no illumination was provided.

Within 72 hours a heavy dense growth had developed. Thirty-six liters of this growth were transferred to 240 liters of fermentation medium which was contained in a 380 liter glass-lined fermentor. The fermentation medium had the same composition as the inoculum medium except that the concentration of zinc sulfate heptahydrate was increased to 40 mg. per liter and sodium borate decahydrate was added at a level of 20 mg. per liter.

The interior of the fermentor was illuminated by two 400 watt mercury vapor lamps which were shielded by heat-resistant glass wells entering at the tank cover and extending down into the medium in the tank.

The contents of the fermentor were agitated continuously and were continuously aerated with sterile air at rates ranging from 5 c.f.m. to 20 c.f.m., while maintaining a slight positive air pressure on the fermentor and maintaining the broth at a temperature of 25°–28° C.

After 164 hours of incubation, 8.87 kg. of wet mold were recovered by filtration on a basket centrifuge. An aliquot was assayed and found to contain 23% solids. The dry mold solids contained 2460 gamma per gram of carotenoid pigments, bringing the total yield of carotenoid pigments to 5000 mg. for the batch. These comprised 2710 mg. of xanthophylls and 2290 mg. of β-carotene and other carotenes.

One thousand gms. of the wet mycelium was ground to a fine pulp with water in a homogenizing mill. The water was filtered off and the mycelial solids were extracted with two successive 6-liter quantities of acetone. Then two more extractions with 3-liter quantities of acetone were made. The pooled acetone extracts were evaporated at low temperature to a thick syrup of about 1 liter in volume. This syrup was assayed and found to contain a total of 66.2 grams of solids, of which 1167 mg. comprised carotenoid pigments and related substances.

The concentrated extract was shaken with 5 liters of Skellysolve B, water was added to break the emulsion, and the Skellysolve layer was separated. One more extraction with 3 liters of Skellysolve B was made. The Skellysolve extracts were pooled and evaporated to a thick syrupy concentrate.

A concentrate weighing 43.2 gm. was obtained, containing a total of 853 mg. of carotenoid pigments. An enriched product was thus obtained containing 19,800 gamma per gram of total carotenoids, of which 10,800 gamma per gram comprised xanthophyll pigments.

*Example 12*

A poultry feed was prepared by comminuting dried mycelium obtained as described in Example 3 in a Wiley (hammer) mill. One pound of the powder thus obtained was thoroughly admixed with 100 pounds of a commercial "start and grow" chick ration having the following composition:

| Component: | |
|---|---|
| Wheat middlings percent (by wt.) | 13.3 |
| Yellow corn meal do | 42.3 |
| Fine ground oats do | 6.6 |
| Alfalfa meal, 17% do | 3.3 |
| Soybean meal do | 13.3 |
| Meal scrap, 55% do | 6.6 |
| Fish meal do | 3.0 |
| Dried corn distillers solubles do | 4.0 |
| Dried whey do | 3.3 |
| Dried skim milk do | 1.0 |
| B.Y.-500 (227 mg. B₂/lb.) do | 0.4 |
| Ground limestone do | 1.0 |
| Dicalcium phosphate do | 1.0 |
| Iodized salt do | 0.3 |
| Vitamin A and D feeding oil (containing 300 U.S.P. vitamin B units and 2250 U.S.P. vitamin A units/gm.) percent (by wt.) | 0.2 |
| Activated animal sterol do | 0.066 |
| Manganese p.p.m. | 65 |
| Cobalt p.p.m. | 0.75 |
| Copper p.p.m. | 1.50 |
| Iodine p.p.m. | 1.50 |
| Iron p.p.m. | 30.0 |
| Zinc p.p.m. | 1.30 |
| Boron p.p.m. | 0.39 |

Example 13

Day old female White Cross chicks were placed in wire floored, heated brooders and allowed to feed ad libitum on a low pigment ration of the following composition:

| Component: | Percent (by wt.) |
|---|---|
| Commercial casein (Sheffield) | 12.0 |
| Corn starch | 72.96 |
| Brewer's yeast (Anheuser Busch, strain G) | 10.0 |
| Cottonseed oil (Wesson oil—contains 700 I.U. vitamin A, 240 chick units vitamin D, 30 mg. α-tocopherol) | 2.0 |
| Iodized salt | 1.0 |
| Salt mixture [1] | 2.0 |
| Choline chloride | 0.02 |
| Manganese sulfate | 0.02 |

[1] Contains calcium carbonate 24%, potassium acid phosphate 24%, calcium hydrogen phosphate 40%, magnesium sulfate heptahydrate 8%, ferric citrate 3.92%, zinc chloride 0.04%, copper sulfate pentahydrate 0.04%.

Vitamin $B_{12}$ was added to the ration at the rate of 15 gamma/kilo of ration.

Three days after being placed on this ration, the birds were divided into five groups of 20 birds each. One group served as a control, and four groups were placed on experimental rations. Dried mycelium of *Dacrymyces deliquescens* or of *Dacryopinax spathularia* was mixed into the basal ration (according to the procedure described in Example 12) in different concentrations and the modified rations were fed as follows:

| Group No. | Mycelium in Ration | Percent |
|---|---|---|
| 1 | No mycelium (Control) | |
| 2 | Dacrymyces deliquescens | 1 |
| 3 | Dacrymyces deliquescens | 2.5 |
| 4 | Dacryopinax spathularia | 0.1 |
| 5 | Dacryopinax spathularia | 0.5 |

The birds were allowed to feed on the rations ad libitum and were provided continuously with an ample quantity of clean water. The experiment was continued for 8 weeks. The birds were weighed weekly. That the mycelium contributed desirable nutritional factors to the ration resulting in growth considerably in excess of the controls is shown by the data in the following table:

| Mycelial Supplement to Ration | Concentration in Diet, percent | Percent Increase in Weight Over Control Group | |
|---|---|---|---|
| | | 7 weeks | 8 weeks |
| Organism: | | | |
| Dacrymyces deliquescens | 1 | 30.4 | 28.6 |
| Dacrymyces deliquescens | 2.5 | 25.4 | 22.7 |
| Dacryopinax spathularia | 0.1 | 26.9 | 26.2 |
| Dacryopinax spathularia | 0.5 | 30.0 | 26.0 |

The birds receiving as little as 1% of *Dacrymyces deliquescens* mycelium in their ration had greatly increased stores of vitamin A in their livers, blood, and body fat than did those birds not receiving the Dacrymyces supplement. The stores of vitamin A in liver and blood were higher, in fact, than in those birds which received a good commercial chick growing ration.

Example 14

White Cross chicks were reared on pigment-free ration, as described in Example 13, until they began to lay eggs. The birds were then caged in individual cages so that each bird could be fed individually and the rate of egg production could be determined. Five of the most productive birds were selected and placed on the pigment-free ration into which had been mixed *Dacrymyces deliquescens* mycelium equivalent to a daily supplement of 2 grams of dry mycelium per day. Five birds similarly housed were fed ration to which no fungal material had been added. The eggs produced were collected and the yolks were assayed for xanthophyll pigments and for β-carotene.

The results obtained are summarized as follows:

| | Ration supplemented with Dacrymyces deliquescens mycelium, gamma/gm. | Nonsupplemented ration, gamma/gm. |
|---|---|---|
| Average: | | |
| Xanthophylls | 1.056 | 0.043 |
| Carotene | 2.543 | 0.35 |

The yolks produced by the birds fed on the ration containing *Dacrymyces deliquescens* mycelium were firm and were colored a deep yellow hue which is considered commercially attractive. The birds fed the nonsupplemented ration produced eggs whose yolks were flabby and almost devoid of color.

Example 15

Additional species of the family Dacrymycetaceae were cultured according to the procedure in Example 3 with the following yields of carotenoids:

| Organism | γ-gm. Carotenoids, D.W. | | | Gms./liter Mycelium (D.W.) |
|---|---|---|---|---|
| | Xanthophylls | Carotenes | Total | |
| Dacrymyces ellisii, ATCC No. 13293 | 470 | 156 | 626 | 17.0 |
| Dacrymyces palmatus, ATCC No. 13294 | 90 | 90 | 180 | 5.9 |
| Dacrymyces minor, ATCC No. 13295 | 520 | 1,110 | 1,630 | 5.8 |
| Dacryopinax spathularia, ATCC No. 13297 | 320 | 590 | 910 | 8.1 |
| Ditiola radicata, ATCC No. 13298 | 430 | 250 | 680 | 15.1 |

We claim:

1. A process for the production of carotenoids which comprises culturing a fungus of the family Dacrymycetaceae in submerged culture in an aqueous medium containing a source of assimilable organic nitrogen, a source of ammonia nitrogen, a metabolizable source of carbon, a metabolizable source of phosphorus and essential trace minerals while maintaining the culture under conditions of aeration and agitation, and subjecting the fungal material to radiation in the visible spectrum.

2. A process as in claim 1 wherein the fungus is the species *Dacrymyces deliquescens*.

3. A process as in claim 1 wherein the fungus is the species *Dacryopinax spathularia*.

4. A process as in claim 1 wherein the fungus is the species *Dacryomitra nuda*.

5. A process as in claim 1 wherein the fungus is the species *Calocera cornea*.

6. A process as in claim 1 wherein the fungus is the species *Femsjonia luteoalba*.

7. A process as in claim 1 wherein the fungus is the species *Guepiniopsis torta*.

8. A process for the production of xanthophylls which comprises culturing a fungus of the family Dacrymycetaceae in submerged culture in an aqueous medium comprising organic nitrogen in a proportion of 0.025 to 2.5 grams of nitrogen per liter of medium, ammonia nitrogen in a proportion of 0.025 to 2.0 grams of nitrogen per liter of medium, metabolizable carbon in a proportion of 1 to 80 grams per liter of medium, metabolizable phosphorus in a proportion of 0.1 to 2.0 grams per liter of medium, and essential trace minerals in a proportion of 1 to 500 milligrams per liter of medium, aerating and agitating said culture and irradiating the fungal material with light in the range of about 3200 A. to 7600 A.

9. A process which comprises culturing *Dacrymyces deliquescens* in submerged culture in an aqueous medium comprising 0.025 to 0.40 gram per liter of amino acid nitrogen, 0.025 to 0.40 grams per liter of ammonia nitrogen, 10 to 50 grams per liter of carbohydrate carbon, 0.1 to 2 grams per liter of phosphorus and 1 to 25 milligrams per liter of essential trace minerals, agitating and aerating said culture with air at a rate of about 0.2 to 2.5 volumes of air per minute per liter, and irradiating the fungal material with light in the range of about 4800 A. to 6500 A.

10. A process for the production of xanthophylls which comprises culturing a fungus of the family Dacrymycetaceae in submerged culture in an aqueous medium comprising organic nitrogen in a proportion of 0.025 to 2.5 grams of nitrogen per liter, ammonia nitrogen in a proportion of 0.025 to 2.0 grams of nitrogen per liter, carbohydrate in a proportion of 5 to 150 grams per liter, phosphorus in a proportion of 0.1 to 2 grams per liter, and essential trace minerals in a proportion of 1 to 500 milligrams per liter, aerating and agitating said culture, irradiating the fungal material with light in the range of about 3200 A. to 7600 A., separating the fungal material from the fermentation broth and drying the fungal tissue.

11. A process for the production of xanthophyll-rich concentrate which comprises culturing a fungus of the family Dacrymycetaceae in submerged culture in an aqueous medium comprising organic nitrogen in a proportion of 0.025 to 2.5 grams of nitrogen per liter, ammonia nitrogen in a proportion of 0.025 to 2.0 grams of nitrogen per liter, carbohydrate in a proportion of 5 to 150 grams per liter, phosphorus in a proportion of 0.1 to 2 grams per liter and essential trace minerals in a proportion of 1 to 500 mg. per liter, aerating and agitating said culture, irradiating the fungal material with light in the range of about 3200 A. to 7600 A., separating the fungal material from the fermentation broth, subjecting the fungal material to solvent extraction to recover the pigment and evaporating the solvent to obtain said xanthophyll-rich concentrate.

12. A xanthophyll-rich composition produced according to the process of claim 10, comprising at least 0.03% of xanthophylls selected from the group consisting of zeaxanthin, canthaxanthin, cryptoxanthin, violaxanthin, torulene, torularhodin and rhodotorulin.

13. A xanthophyll-rich composition produced according to the process of claim 11, comprising at least 1.0% of xanthophylls selected from the group consisting of zeaxanthin, canthaxanthin, cryptoxanthin, violaxanthin, torulene, torularhodin and rhodotorulin.

14. An animal feed comprising a major proportion of basal ration and a minor amount of dried, comminuted fungal tissue of the family Dacrymycetaceae, rich in xanthophylls selected from the group consisting of zeaxanthin, canthaxanthin, cryptoxanthin, violaxanthin, torulene, torularhodin and rhodotorulin.

References Cited in the file of this patent

UNITED STATES PATENTS 2,865,814      Hesseltine et al. _____ Dec. 23, 1958

OTHER REFERENCES

Palmer: Carotenoids and Related Pigments, Monograph Series No. 9, 1922, Reinhold Publishing Corp., pages 113–115, 123–124. POSL: QP 671–P3. (Also Div. 63.)

Bessey: Morphology and Taxonomy of Fungi, The Blakiston Co., 1950, Phila., page 449. (Div. 63.) QK–603–B4.

Barnett et al.: Science, vol. 123, No. 3187, Jan 27, 1956, page 141 (195–78), POSI: Q1–S–34.